(12) United States Patent
Liu

(10) Patent No.: US 10,762,194 B2
(45) Date of Patent: Sep. 1, 2020

(54) PROGRAM FILE CLASSIFICATION METHOD, PROGRAM FILE CLASSIFICATION APPARATUS, AND PROGRAM FILE CLASSIFICATION SYSTEM

(71) Applicant: Huawei Technologies Co., Ltd., Shenzhen (CN)

(72) Inventor: Zhenhua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 373 days.

(21) Appl. No.: 15/870,545

(22) Filed: Jan. 12, 2018

(65) Prior Publication Data

US 2018/0189481 A1 Jul. 5, 2018

Related U.S. Application Data

(63) Continuation of application No. PCT/CN2016/108901, filed on Dec. 7, 2016.

(30) Foreign Application Priority Data

Jan. 26, 2016 (CN) .......................... 2016 1 0052993

(51) Int. Cl.
*G06F 21/53* (2013.01)
*G06F 16/00* (2019.01)
(Continued)

(52) U.S. Cl.
CPC .............. *G06F 21/53* (2013.01); *G06F 16/00* (2019.01); *G06F 21/55* (2013.01); *G06K 9/6218* (2013.01)

(58) Field of Classification Search
CPC .......... G06F 21/53; G06F 16/00; G06F 21/55; G06F 16/285; G06K 9/6218
See application file for complete search history.

(56) References Cited

U.S. PATENT DOCUMENTS 7,461,086 B1 * 12/2008 Hurren ...................... G06F 8/61
8,713,680 B2 * 4/2014 Park ........................ G06F 21/57
726/24

(Continued)

FOREIGN PATENT DOCUMENTS

CN 1360267 A 7/2002
CN 101079851 A 11/2007
(Continued)

OTHER PUBLICATIONS

Machine Translation and Abstract of Chinese Publication No. CN1360267, Jul. 24, 2002, 20 pages.
(Continued)

*Primary Examiner* — Saleh Najjar
*Assistant Examiner* — Feliciano S Mejia
(74) *Attorney, Agent, or Firm* — Conley Rose, P.C.

(57) ABSTRACT

A program file classification method, a program file classification apparatus, and a program file classification system, where the system sets an agent program in a client and a sandbox server to obtain behavior information corresponding to at least two behaviors executed by a program file at runtime. Each piece of behavior information includes a behavior identifier and a path related during execution of a corresponding behavior. A classification server performs normalization process on the path in each piece of behavior information, where the normalization process reduces path diversity, generates a feature vector according to at least two pieces of behavior information obtained after the path normalization process, and determines, according to the feature vector, a category to which the program file belongs. Because normalization process is performed on the path, randomness of a path obtained after the normalization process is reduced.

16 Claims, 9 Drawing Sheets

(51) Int. Cl.
*G06F 21/55* (2013.01)
*G06K 9/62* (2006.01)

(56) References Cited

U.S. PATENT DOCUMENTS

| | | | |
|---|---|---|---|
| 9,349,006 B2* | 5/2016 | Zhou | G06F 21/566 |
| 9,489,514 B2* | 11/2016 | Mankin | G06F 21/562 |
| 9,497,219 B2* | 11/2016 | Lim | G06F 9/468 |
| 9,619,338 B2* | 4/2017 | Hamborg | G06F 16/113 |
| 9,672,355 B2* | 6/2017 | Titonis | G06F 21/56 |
| 9,772,927 B2* | 9/2017 | Gounares | G06F 3/0484 |
| 9,787,695 B2* | 10/2017 | Gantman | H04L 63/1416 |
| 9,992,211 B1* | 6/2018 | Viljoen | G06F 21/56 |
| 10,437,986 B2* | 10/2019 | Vejmelka | G06F 16/2246 |
| 10,536,482 B2* | 1/2020 | Gabaev | G06F 21/52 |
| 2009/0019171 A1 | 1/2009 | Liu et al. | |
| 2009/0037440 A1* | 2/2009 | Will | G06F 16/355 |
| 2013/0291111 A1 | 10/2013 | Zhou et al. | |
| 2014/0137255 A1 | 5/2014 | Wang et al. | |
| 2014/0201208 A1* | 7/2014 | Satish | G06F 21/564 707/737 |
| 2015/0074810 A1 | 3/2015 | Saher et al. | |
| 2015/0319187 A1* | 11/2015 | Huang | G06F 3/0488 726/25 |
| 2016/0078227 A1* | 3/2016 | Bae | G06F 21/6209 726/23 |
| 2016/0277423 A1* | 9/2016 | Apostolescu | H04L 63/145 |
| 2017/0046510 A1* | 2/2017 | Chen | G06F 21/552 |

FOREIGN PATENT DOCUMENTS

| | | |
|---|---|---|
| CN | 102567661 A | 7/2012 |
| CN | 102779249 A | 11/2012 |
| CN | 103902443 A | 7/2014 |
| CN | 104392174 A | 3/2015 |
| CN | 105095296 A | 11/2015 |
| WO | 0141064 A2 | 6/2001 |

OTHER PUBLICATIONS

Machine Translation and Abstract of Chinese Publication No. CN103902443, Jul. 2, 2014, 21 pages.
Machine Translation and Abstract of Chinese Publication No. CN104392174, Mar. 4, 2015, 24 pages.
Machine Translation and Abstract of Chinese Publication No. CN105095296, Nov. 25, 2015, 23 pages.
Foreign Communication From a Counterpart Application, Chinese Application No. 201610052993.6, Chinese Office Action dated Apr. 19, 2019, 8 pages.
Ernst, R., et al., "Embedded program timing analysis based on path clustering and architecture classification," XP058332057, Computer—Aided Design, Digest of Technical Papers, Nov. 13, 1997, pp. 598-604.
Foreign Communication From a Counterpart Application, European Application No. 16887739.7, Extended European Search Report dated Aug. 23, 2018, 7 pages.
Machine Translation and Abstract of Chinese Publication No. CN102779249, Nov. 14, 2012, 17 pages.
Foreign Communication From a Counterpart Application, PCT Application No. PCT/CN2016/108901, English Translation of International Search Report dated Mar. 20, 2017, 2 pages.

* cited by examiner

```
<record id="4443" type="monitor" mid="4434" mtype="1">
  <tick>116734</tick>
  <pname>HelpCtr.exe</pname>
  <pid>2528</pid>
  <tid>2532</tid>
  <action arg1="HKLM\SOFTWARE\Microsoft\Windows NT\CurrentVersion\Drivers32\wsacm msgsm610">RegQueryValue</action>
</record>
<record id="4444" type="monitor" mid="4435" mtype="1">
  <tick>116734</tick>
  <pname>100507.exe</pname>
  <pid>2428</pid>
  <tid>2432</tid>
  <action arg1="C:\WINDOWS\system32\runonce.exe" arg2="Offset: 2397 Length: 1" arg3="SUCCESS">FAST_FWRITE</action>
</record>
<record id="4445" type="monitor" mid="4436" mtype="1">
  <tick>116734</tick>
  <pname>100507.exe</pname>
  <pid>2428</pid>
  <tid>2432</tid>
  <action arg1="C:\WINDOWS\system32\runonce.exe" arg2="Offset: 2398 Length: 1" arg3="SUCCESS">FAST_FWRITE</action>
</record>
<record id="4446" type="monitor" mid="4437" mtype="1">
  <tick>116734</tick>
  <pname>100507.exe</pname>
  <pid>2428</pid>
  <tid>2432</tid>
  <action arg1="C:\WINDOWS\system32\runonce.exe" arg2="Offset: 2399 Length: 1" arg3="SUCCESS">FAST_FWRITE</action>
</record>
<record id="4447" type="monitor" mid="4438" mtype="1">
  <tick>116734</tick>
  <pname>100507.exe</pname>
  <pid>2428</pid>
  <tid>2432</tid>
  <action arg1="C:\WINDOWS\system32\runonce.exe" arg2="Offset: 2400 Length: 1" arg3="SUCCESS">FAST_FWRITE</action>
</record>
```

"0010e3f57b376ae83f7b97dfc4efd5fe"
[1L, 2L, 3L, 4L, 6L, 7L, 5L, 8L, 9L, 10L, 688L, 1184L, 1336L, 1337L, 2512L, 1373L, 14L, 15L, 60L, 11L, 12L, 13L, 661L, 1370L, 1289L, 41L, 1372L, 61L, 124L, 125L, 126L, 287L, 1216L, 51L, 1217L, 1218L, 1219L, 1220L, 1221L, 1222L, 1223L, 129L, 482L, 164L, 167L, 130L, 2513L, 87L, 74L, 75L, 76L, 291L, 293L, 39L, 2514L, 1229L, 1230L, 1231L, 1232L, 1233L, 1234L, 1235L, 1236L, 1223L, 2515L, 2516L, 2517L, 1237L, 1238L, 2518L, 2519L, 1530L, 2519L, 1378L, 1426L, 1427L, 2520L, 2521L, 2522L, 2523L, 2524L, 2525L, 2526L, 2527L, 2528L, 21L, 542L, 54L, 336L, 296L, 368L, 2529L, 715L, 1349L, 1379L, 273L, 2530L, 40L, 322L, 165L, 166L, 168L, 169L, 170L, 171L, 2528L, 173L, 174L, 175L, 176L, 177L, 178L, 179L, 180L, 181L, 182L, 183L, 184L, 185L, 142L, 144L, 186L, 187L, 188L, 189L, 190L, 191L, 193L, 194L, 195L, 196L, 197L, 198L, 199L, 200L, 201L, 202L, 203L, 204L, 205L, 137L, 206L, 207L, 208L, 209L, 210L, 211L, 212L, 213L,

FIG. 2B

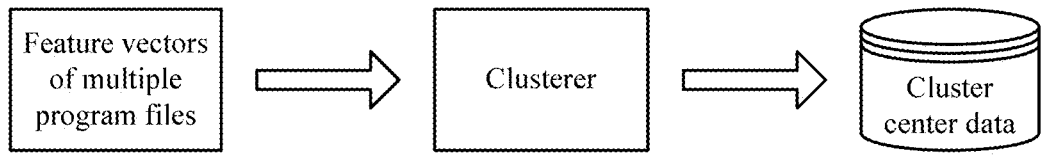
FIG. 6
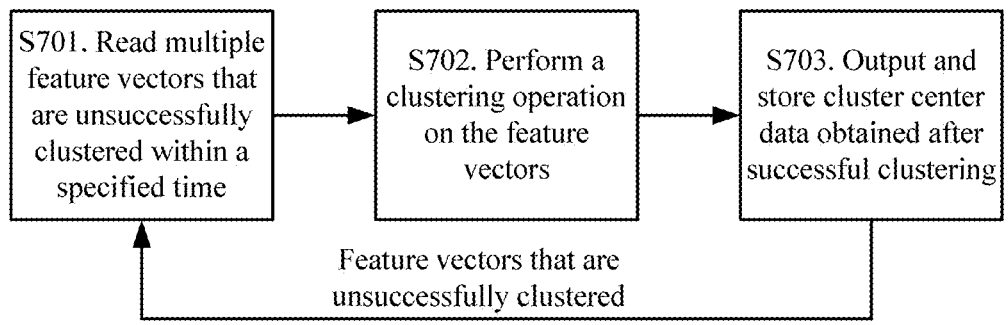
FIG. 7
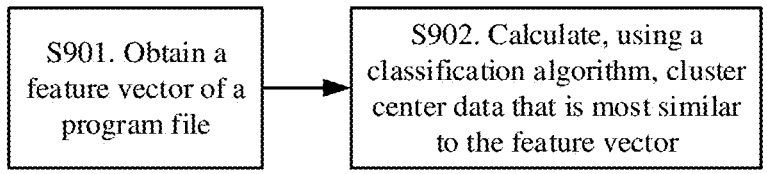
FIG. 8
FIG. 9

PROGRAM FILE CLASSIFICATION METHOD, PROGRAM FILE CLASSIFICATION APPARATUS, AND PROGRAM FILE CLASSIFICATION SYSTEM

CROSS-REFERENCE TO RELATED APPLICATIONS

This application is a continuation of International Patent Application No. PCT/CN2016/108901 filed on Dec. 7, 2016, which claims priority to Chinese Patent Application No. 201610052993.6 filed on Jan. 26, 2016, both of which are hereby incorporated by reference in their entireties.

TECHNICAL FIELD

Embodiments of the present disclosure relate to the computer field, and in particular, to a program file classification method, a program file classification apparatus, and a program file classification system.

BACKGROUND

Malicious program files account for a large proportion of advanced persistent threat (APT) attacks in an enterprise. Therefore, in defense against APTs, how to identify and discover a malicious program file in time becomes a highly important technology. However, a large quantity of program files exist in an intranet of large and medium-sized enterprises, and deep analysis of the program files one by one requires a huge workload and is almost impossible. To resolve this problem, a method for classifying program files in an enterprise using behaviors of the program files at runtime is put forward in other approaches. Compared with analysis of each program file, analysis of each category of program file can help to reduce the workload to some extent.

Further, classification of program files in an enterprise is using behaviors of the program files at runtime as feature vectors for machine clustering and classification to classify a large quantity of program files in the enterprise into several program file categories. Therefore, provided that an analyst randomly samples several program files from program files of each category for deep analysis, the analyst can understand whether the program files of this category are suspicious. In addition, minor program files that are unclassified, or not easy to classify, or in a category including few program files can be discovered in time such that analysis is focused on the minor program files, and a malicious program file is discovered in time. In this way, a workload in analyzing a mass of program files can be effectively reduced, and analysis efficiency can be improved.

In the other approaches, classification of the program files is directly using behavior information, such as string information, in behavior sequences of the program files, to form feature vectors for calculation. Because parameter information of paths in various types of behavior information is highly random, there is a big difference between the feature vectors, and a classification effect is poor. Consequently, a similarity between behavior information cannot be effectively used for clustering and classification.

SUMMARY

Embodiments of the present disclosure provide a program file classification method, a program file classification apparatus, and a program file classification system in order to improve a program file classification effect and accordingly reduce a workload in identifying a malicious program file.

According to a first aspect, the present disclosure provides a program file classification method, including obtaining behavior information respectively corresponding to at least two behaviors executed by a program file at runtime, where each piece of behavior information includes a behavior identifier and a path related during execution of a corresponding behavior, performing normalization process on the path in each piece of behavior information, where the normalization process is used to reduce path diversity, generating a feature vector according to at least two pieces of behavior information obtained after the path normalization process, where each element in the feature vector corresponds to one piece of behavior information obtained after the path normalization process, values of elements corresponding to same behavior information obtained after the path normalization process are the same, and the same behavior information is behavior information that has a same behavior identifier and a same path obtained after the normalization process, and determining, according to the feature vector, a category to which the program file belongs.

According to the program file classification method in the present disclosure, the behavior information respectively corresponding to the at least two behaviors of the program file is obtained. The normalization process is performed on the path of the behavior in the behavior information to reduce the path diversity. The feature vector is generated according to the behavior information obtained after the path normalization process, and the category to which the program file belongs is determined according to the feature vector such that randomness of a path obtained after the normalization process is reduced in order to improve a program file classification effect and accordingly reduce a workload of staff in identifying a malicious program file.

There may be the following several types of normalization process.

The path in the behavior information includes M levels of directories of a file, and performing normalization process on the path in each piece of behavior information includes replacing the first N levels of directories in the M levels of directories with a first identifier and replacing remaining M-N levels of directories in the M levels of directories with a number M-N if the M levels of directories meet a first regular expression, where a mapping relationship between the first regular expression and the first identifier is one of first-type mapping relationships, the first-type mapping relationships include at least one mapping relationship between a regular expression and an identifier, M is a positive integer, and N is a positive integer less than or equal to M, or reserving the first L levels of directories in the M levels of directories and replacing remaining M-L levels of directories in the M levels of directories with a number M-L if the M levels of directories do not meet any mapping relationship in the first-type mapping relationships, where L is a positive integer less than or equal to M.

It should be understood that, that the M levels of directories meet the first regular expression may be equivalent to that the M levels of directories include a special directory, such as a first directory.

The path in the behavior information includes a file name and a file name extension, and performing normalization process on the path in each piece of behavior information includes replacing the file name with a second identifier if the file name meets a predetermined file name feature, where a mapping relationship between the predetermined file name feature and the second identifier is one of second-type mapping relationships, and the second-type mapping relationships include at least one mapping relationship between an identifier and a feature met by a file name, and replacing the file name extension with a preset third identifier if the file name extension is not a file name extension in a preset file name extension list.

The path in the behavior information includes S levels of subkeys of a registry, and performing normalization process on the path in each piece of behavior information includes reserving the first T levels of subkeys in the S levels of subkeys, and deleting remaining S-T levels of subkeys in the S levels of subkeys if the S levels of subkeys meet a third regular expression, where a mapping relationship between the third regular expression and T is one of third-type mapping relationships, the third-type mapping relationships include at least one mapping relationship between a regular expression and an integer, S is a positive integer, and T is a positive integer less than or equal to S, and replacing the first subkey with a fourth identifier if a first subkey in the S levels of subkeys is a globally unique identifier CLSID.

It should be understood that, that the S levels of subkeys meet the third regular expression may be equivalent to that the S levels of subkeys include a special subkey.

The foregoing normalization is obtained by summarizing behaviors of malicious programs for a long time, or in other words, obtained based on experience. A quantity of features of program files can be reduced using the path normalization process implemented in the present disclosure. In one case, a quantity of elements in a feature vector of a program file may be reduced. In another case, a quantity of same features of any two program files may be increased such that the program files are more effectively classified.

With reference to the first aspect, in a possible implementation, determining, according to the feature vector, a category to which the program file belongs includes determining a similarity between the element in the feature vector and cluster center data of each of multiple program file categories using a classification algorithm, where the cluster center data is used to indicate a feature of a program file in a program file category to which the cluster center data belongs, and includes an element in a feature vector of the program file in the program file category to which the cluster center data belongs, and classifying the program file into a first program file category, where a similarity between the element in the feature vector and cluster center data of the first program file category is higher than a similarity between the element in the feature vector and cluster center data of any program file category other than the first program file category in the multiple program file categories.

It should be understood that, the cluster center data in the present disclosure may be obtained by clustering the feature vectors of the multiple program files using a clustering algorithm during clustering of the multiple program files, and be used to indicate the feature of the program file in the program file category to which the cluster center data belongs.

With reference to the first aspect, in another possible implementation, determining, according to the feature vector, a category to which the program file belongs includes clustering the feature vector and feature vectors of multiple other program files using a clustering algorithm to form at least one program file category, where a similarity between elements in feature vectors of program files in each program file category is higher than a threshold, and the program file is classified into a first program file category in the at least one program file category.

With reference to the first aspect, in a possible implementation, generating a feature vector according to at least two pieces of behavior information obtained after the path normalization process includes indicating, as an integer, each piece of behavior information obtained after the path normalization process, where same behavior information obtained after the path normalization process is indicated as a same integer, and setting each integer as one element in the feature vector, where multiple integers form the feature vector.

With reference to the first aspect, in a possible implementation, obtaining behavior information respectively corresponding to at least two behaviors executed by a program file at runtime includes obtaining the program file using a monitor program, and obtaining a behavior sequence of the program file using a sandbox server, where the behavior sequence includes the behavior information respectively corresponding to the at least two behaviors.

According to a second aspect, a program file classification apparatus is provided, including an obtaining module configured to obtain behavior information respectively corresponding to at least two behaviors executed by a program file at runtime, where each piece of behavior information includes a behavior identifier and a path related during execution of a corresponding behavior, a normalization module configured to perform normalization process on the path in each piece of behavior information obtained by the obtaining module, where the normalization process is used to reduce path diversity, a generation module configured to generate a feature vector according to at least two pieces of behavior information obtained after the path normalization process performed by the normalization module, where each element in the feature vector corresponds to one piece of behavior information obtained after the path normalization process, values of elements corresponding to same behavior information obtained after the path normalization process are the same, and the same behavior information is behavior information that has a same behavior identifier and a same path obtained after the normalization process, and a classification module configured to determine, according to the feature vector generated by the generation module, a category to which the program file belongs.

It should be understood that the modules of the program file classification apparatus in the second aspect may be configured to implement the program file classification method in the first aspect and the possible implementations of the first aspect. Details are not further described herein.

In a specific implementation of the second aspect, the program file classification apparatus in the second aspect is a classification server.

According to a third aspect, a program file classification system is provided, including a client, a sandbox server, and a program file classification apparatus, where the client includes a monitor program such that a program file in the client is obtained using the monitor program. The sandbox server is configured to receive the program file sent by the monitor program in order to generate a behavior sequence of the program file and provide the generated behavior sequence for the program file classification apparatus, where the behavior sequence includes behavior information respectively corresponding to at least two behaviors, and the program file classification apparatus is configured to execute the method according to the first aspect and corresponding implementations.

In the present disclosure, the program file may be referred to as an executable program file.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic diagram of behavior information respectively corresponding to multiple behaviors executed by a program file at runtime;

FIG. 2A and FIG. 2B are schematic diagrams of hash values of program files in two groups and results of converting behavior sequences of the program files at runtime into feature vectors by means of abstraction;

FIG. 6 is a schematic diagram of implementing a clustering function according to an embodiment of the present disclosure;

FIG. 7 is a schematic flowchart of implementing a clustering function according to an embodiment of the present disclosure;

FIG. 8 is a schematic diagram of implementing a classification function according to an embodiment of the present disclosure;

FIG. 9 is a schematic flowchart of implementing a classification function according to an embodiment of the present disclosure;

DESCRIPTION OF EMBODIMENTS

Figure 3:
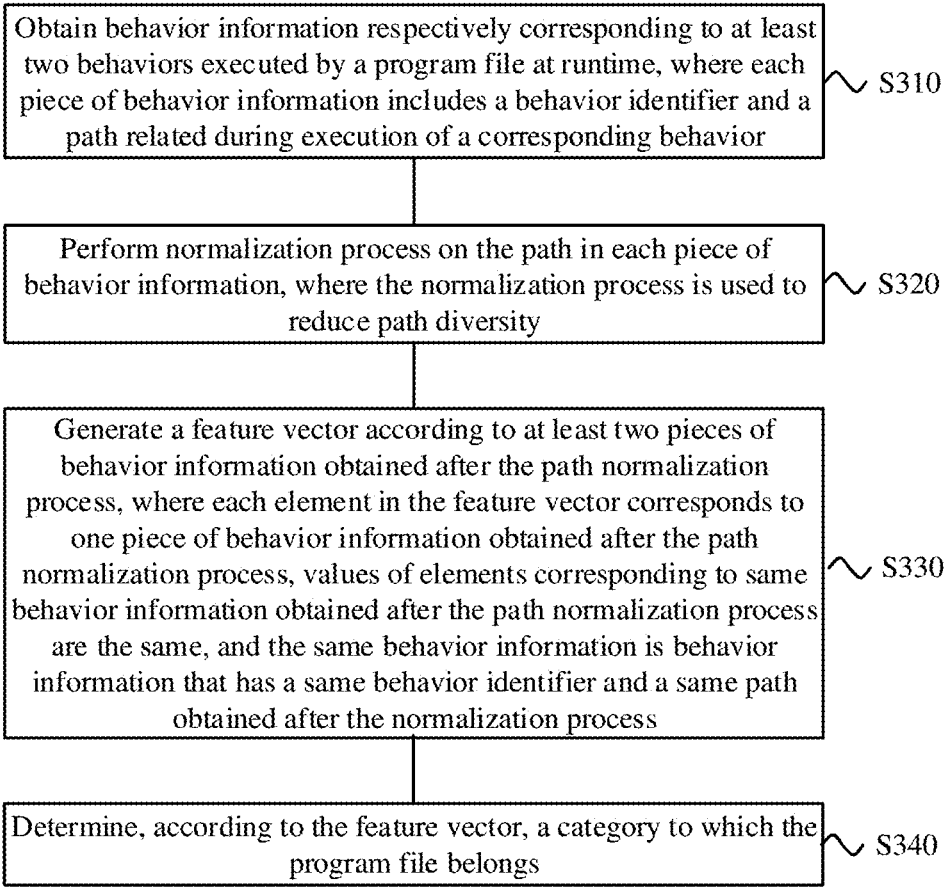
FIG. 3 is a schematic flowchart of a program file classification method according to an embodiment of the present disclosure.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

First, some technologies related to program file classification are briefly described. It should be understood that a program file in this specification is also referred to as an executable program file.

A program file initiates a system service request to an operating system at runtime. The system service request may also be referred to as an application programming interface (API) call. API calls may include file reading/writing, memory allocation, network input/output (IO), a hardware device operation, system configuration reading/writing, and the like, and are not limited in the embodiments of the present disclosure. The API call of the program file at runtime is referred to as a "behavior" of the program file in the industry, and a sequence of the API call is referred to as a "behavior sequence" of the program file. The behavior sequence includes multiple pieces of behavior information. Each piece of behavior information corresponds to one behavior, and each piece of behavior information includes a path related during execution of the corresponding behavior.

FIG. 1 is a schematic diagram of behavior information respectively corresponding to multiple behaviors executed by a program file at runtime. For example, for behavior information <action arg1="HKLM\SOFTWARE\Microsoft\Windows NT\CurrentVersion\Drivers32\msacm.msgsm610">RegQueryValue</action>, a path related during execution of a behavior is HKLM\SOFTWARE\Microsoft\Windows NT\CurrentVersion\Drivers32\msacm.msgsm610. A subkey path of a registry is HKLM\SOFTWARE\Microsoft\Windows NT\CurrentVersion\Drivers32, and a registry value name is msacm.msgsm610. A behavior identifier is RegQueryValue. A specific behavior is executing a registry operation function RegQueryValue.

A program file generally has multiple different versions. A new version may be an error fix, a function improvement, or the like. However, basic functions that need to be implemented by programs of the different versions are consistent. Therefore, procedures and behaviors of program files of the different versions at runtime in a same environment are extremely similar.

Figure 2A:
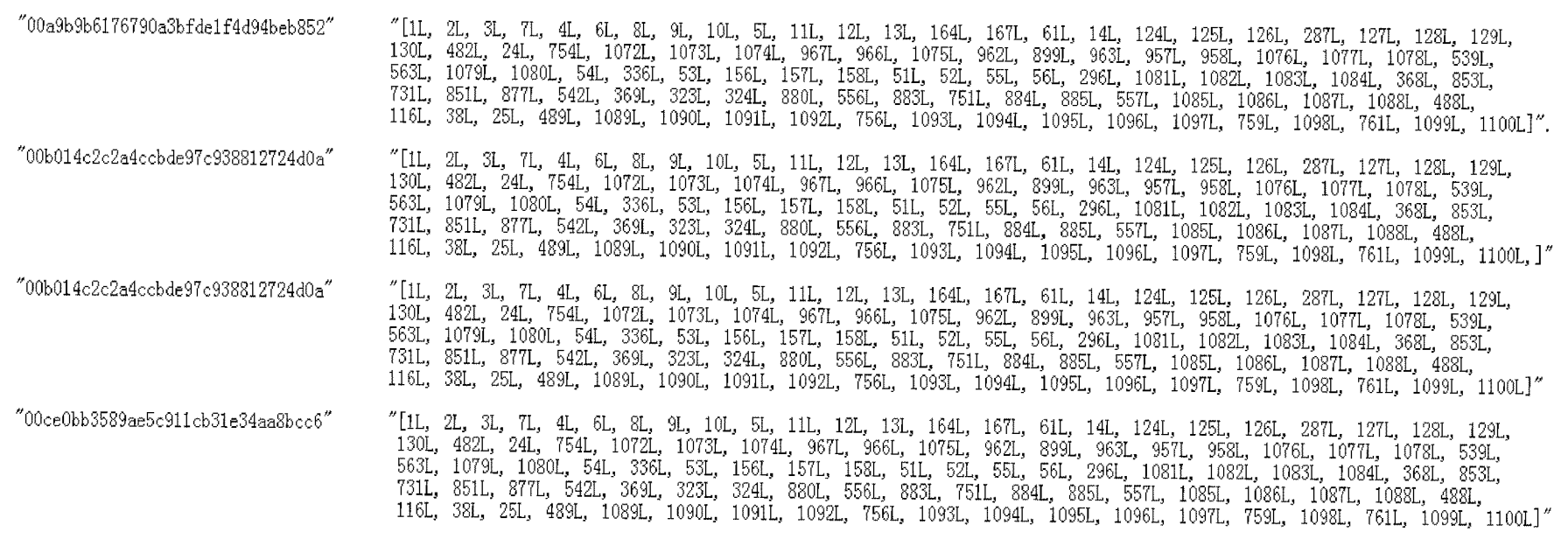

By virtue of this feature, in the embodiments of the present disclosure, statistical analysis of a similarity between program files is performed using behaviors of the program files at runtime, and program files having similar behaviors are classified into one category. FIG. 2A and FIG. 2B are respectively schematic diagrams of hash values of program files in two groups, for example, message digest algorithm 5 (MD5) values, and results of converting behavior sequences of the program files at runtime into feature vectors by means of abstraction. The MD5 values are shown in a column on the left side, each MD5 value indicates one program file, and the feature vectors corresponding to the program files are shown on the right side. It can be learned that the MD5 values of the program files in each of the two groups are different from each other, but the feature vectors of the program files in each group are extremely similar.

However, in the other approaches, classification of program files is directly using behavior information in behavior sequences of the program files to form feature vectors for calculation. Because paths related to behaviors corresponding to the behavior information are highly random, there is a big difference between the feature vectors of the program files, and a classification effect is poor. Consequently, a similarity between behavior information cannot be effectively used for clustering and classification.

FIG. 3 is a schematic flowchart of a program file classification method 300 according to an embodiment of the present disclosure. The method 300 may include the following steps.

Step S310: Obtain behavior information respectively corresponding to at least two behaviors executed by a program file at runtime, where each piece of behavior information includes a behavior identifier and a path related during execution of a corresponding behavior.

Step S320: Perform normalization process on the path in each piece of behavior information, where the normalization process is used to reduce path diversity.

Step S330: Generate a feature vector according to at least two pieces of behavior information obtained after the path normalization process, where each element in the feature vector corresponds to one piece of behavior information obtained after the path normalization process, values of elements corresponding to same behavior information obtained after the path normalization process are the same, and the same behavior information is behavior information that has a same behavior identifier and a same path obtained after the normalization process.

Step S340: Determine, according to the feature vector, a category to which the program file belongs.

Obtaining behavior information respectively corresponding to at least two behaviors executed by a program file at runtime in step S310 may include obtaining the program file using a monitor program, and obtaining a behavior sequence of the program file using a sandbox server, where the behavior sequence includes the behavior information respectively corresponding to the at least two behaviors.

Figure 4:
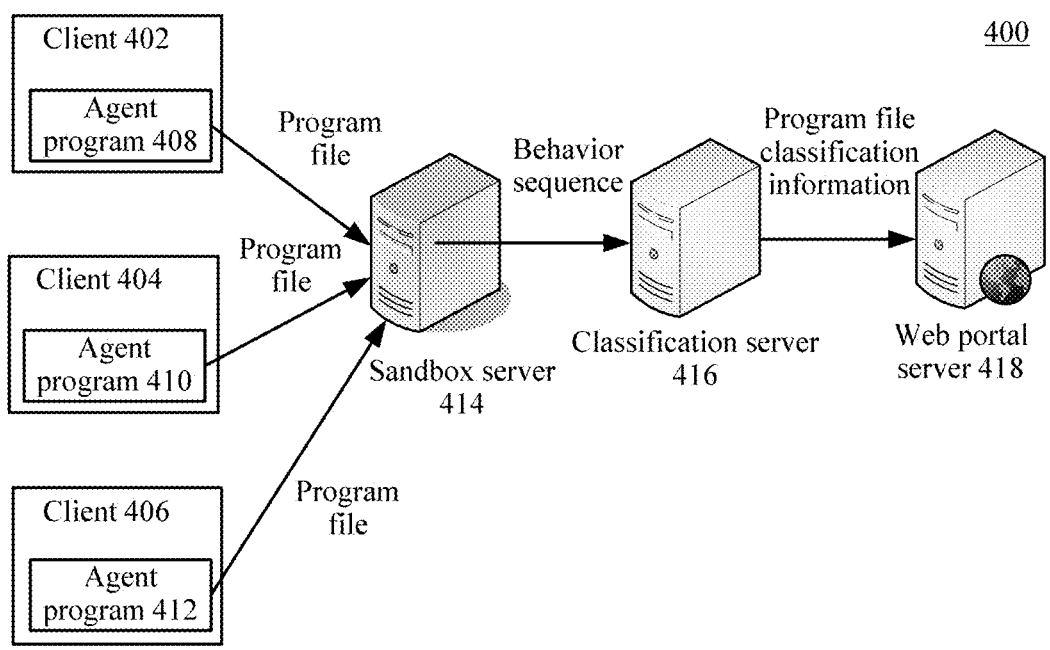
FIG. 4 is a schematic diagram of a program file classification system according to an embodiment of the present disclosure.

In a specific example, as shown in FIG. 4, in a program file classification system 400, monitor programs, such as agent programs an agent program 408, an agent program 410, and an agent program 412, may be respectively deployed on multiple enterprise clients, such as a client 402, a client 404, and a client 406. The agent programs 408, 410 and 412 are responsible for monitoring executable program files, especially newly added executable program files, on the enterprise clients 402, 404 and 406 in real time. The executable program file may be obtained using the monitor program according to a commonly used technology, and details are not described herein.

The agent programs 408, 410 and 412 on the clients 402, 404 and 406 send the program files to a remote sandbox (such as sandboxie) server 414. The sandbox server 414 continuously receives program files sent from different clients 402, 404 and 406, and generates behavior sequences of the program files. As shown in FIG. 1, the behavior sequence includes multiple pieces of behavior information, each piece of behavior information corresponds to one behavior, and each piece of behavior information includes a path related during execution of the corresponding behavior. The sandbox server 414 outputs the behavior sequence of each program file at runtime to a classification server 416 such that the classification server 416 classifies the program files. A sandboxing technology may also be a commonly used technology, and details are not described herein.

The classification server 416 abstracts behaviors of the program file, and generates a feature vector according to behavior information included in the behavior sequence of each program file. In step S320, the classification server 416 may perform normalization process on the path in each piece of behavior information. The normalization process is used to reduce behavior information diversity. The feature vector is generated according to multiple pieces of behavior information obtained after the path normalization process. Each element in the feature vector corresponds to one piece of behavior information obtained after the path normalization process. Values of elements corresponding to same behavior information obtained after the path normalization process are the same. Specific normalization process is expounded below.

Generating a feature vector according to at least two pieces of behavior information obtained after the path normalization process in step S330 may include indicating, as an integer, each piece of behavior information obtained after the path normalization process, where same behavior information obtained after the path normalization process is indicated as a same integer, and setting each integer as one element in the feature vector, where multiple integers form the feature vector.

Further, each piece of behavior information obtained after the path normalization process corresponds to one integer. In this case, behavior information corresponding to multiple behaviors in a behavior sequence corresponding to a program file may correspond to multiple integers. The multiple integers form an integer sequence, and the integer sequence is a feature vector. Elements in the feature vector are the integers. Each integer may also be referred to as a feature, indicating a behavior of the program file.

According to the program file classification method in this embodiment of the present disclosure, the behavior information respectively corresponding to the at least two behaviors of the program file is obtained. The normalization process is performed on the path of the behavior in the behavior information, to reduce the path diversity. The feature vector is generated according to the behavior information obtained after the path normalization process, and the category to which the program file belongs is determined according to the feature vector such that randomness of the path obtained after the normalization process is reduced, and accordingly, a program file classification effect is greatly improved.

Further, in the other approaches, a feature vector is generated according to behavior information on which no normalization process is performed, and an effect of clustering or classifying program files according to the feature vector is poor. For example, in the other approaches, 100 program files are to be classified, and correspond to 100 feature vectors. There is a big difference between elements in one of the 100 feature vectors and elements in each of the remaining feature vectors, and an effect of clustering or classification is to obtain 99 program file categories. During execution of the method in this embodiment of the present disclosure, 100 to-be-classified program files correspond to 100 feature vectors, and a difference between elements in one of the 100 feature vectors and elements in each of the remaining feature vectors is greatly reduced in comparison with that in the other approaches such that a possible effect of clustering or classification is to obtain five program file categories. In this way, the program file classification effect is greatly improved, and a workload in subsequently identifying a malicious program file can be accordingly reduced.

Figure 5:
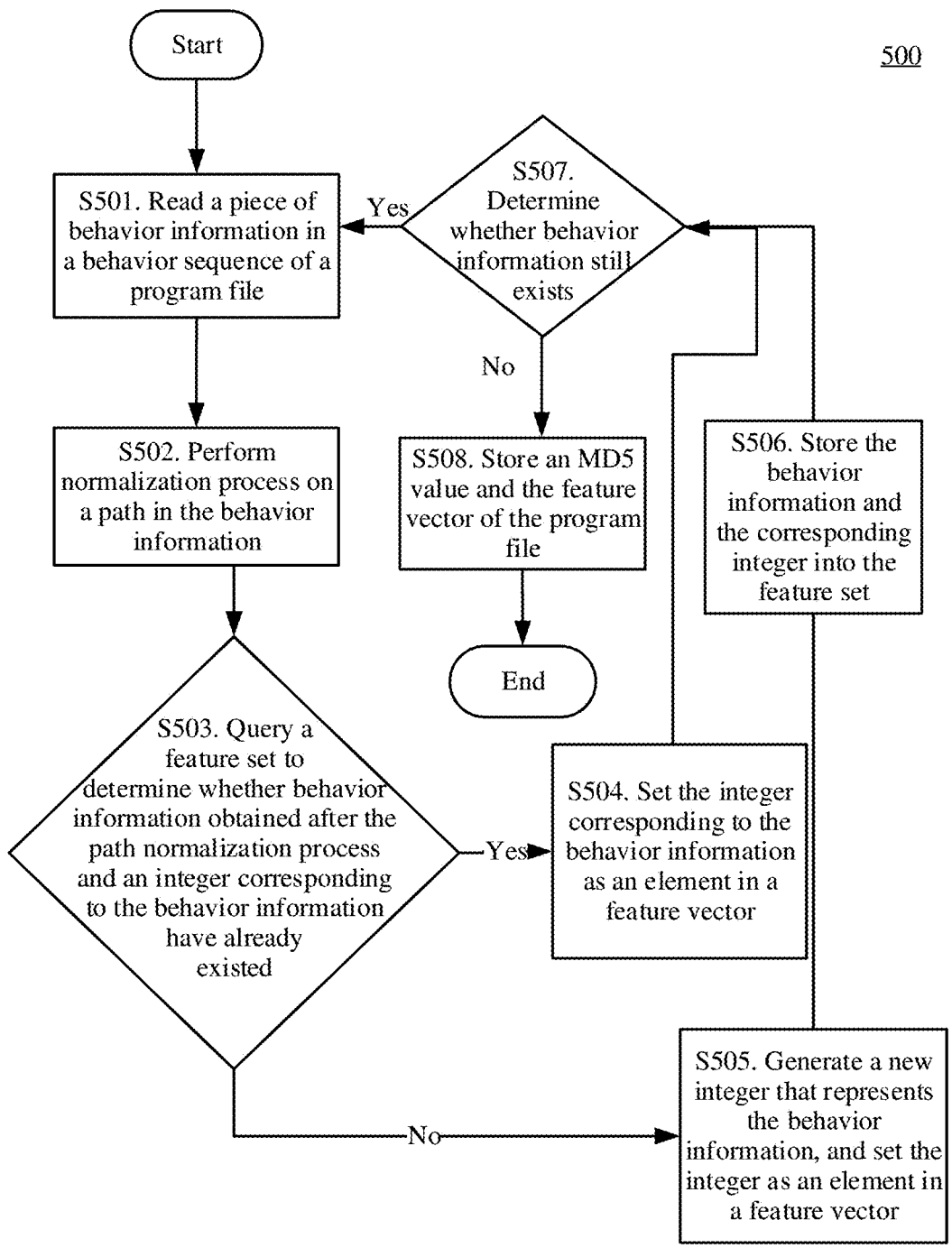
FIG. 5 is a schematic flowchart of generating a feature vector according to an embodiment of the present disclosure.

FIG. 5 is a schematic flowchart 500 of generating a feature vector according to an embodiment of the present disclosure.

For a program file, step S501 of reading a piece of behavior information in a behavior sequence of the program file is performed.

In step S502, normalization process is performed on a path in the behavior information. The behavior information includes a path related during execution of a corresponding behavior. The path related during execution of the corresponding behavior may include M levels of directories of a file, a file name, and a file name extension. Alternatively, the path related during execution of the corresponding behavior may include S levels of subkeys of a registry and a registry value name. Performing normalization process on a path in each piece of behavior information may be simplifying the path according to some preset normalization rules.

In step S503, a feature set is queried to determine whether behavior information obtained after the path normalization process and an integer corresponding to the behavior information have already existed. The feature set includes multiple pieces of behavior information and integers respectively corresponding to the multiple pieces of behavior information. When the behavior information and the corresponding integer exist, step S504 of setting the integer corresponding to the behavior information as an element in a feature vector is performed, and then step S507 is performed. When the behavior information and the corresponding integer do not exist, step S505 of generating a new integer that represents the behavior information, and setting the integer as an element in a feature vector is performed, and step S506 of storing the behavior information and the corresponding integer into the feature set is performed, and then step S507 is performed.

In step S507, it is determined whether behavior information still exists in the behavior sequence. When the behavior information exists, step S501 is performed. When no behavior information exists, the feature vector corresponding to the program file is obtained, and step S508 of storing an MD5 value and the feature vector of the program file is performed and the procedure ends.

A classification server 416 uses an integer sequence obtained in step S507 as a feature vector for clustering and classification in machine learning. Two functions may be provided inside the classification server 416.

One function is used to implement clustering. Further, the feature vector and feature vectors of multiple other program files are clustered using a clustering algorithm to form at least one program file category. A similarity between elements in feature vectors of program files in each program file category is higher than a threshold, and the program file is classified into a first program file category in the at least one program file category.

FIG. 6 is a schematic diagram of implementing a clustering function according to an embodiment of the present disclosure. FIG. 7 is a schematic flowchart 700 of implementing a clustering function according to an embodiment of the present disclosure. The clustering function may be implemented by a clusterer. In step S701, the clusterer reads multiple original feature vectors that are not clustered, or reads multiple feature vectors that are unsuccessfully clustered or classified within a specified time. In step S702, the clusterer performs a clustering operation on feature vectors of multiple program files using a clustering algorithm to generate multiple clusters and cluster center data of the clusters. Each cluster is a program file category. Each program file category has cluster center data. The cluster center data includes a corresponding element in a feature vector of a program file in a program file category corresponding to the cluster center data. In step S703, cluster center data obtained after successful clustering is output and stored, for reference in subsequent clustering or classification.

The other function is used to implement classification. Further, a similarity between the element in the feature vector and cluster center data of each of multiple program file categories is determined using a classification algorithm. The cluster center data is used to indicate a feature of a program file in a program file category to which the cluster center data belongs, and includes an element in a feature vector of the program file in the program file category to which the cluster center data belongs. The program file is classified into a first program file category. A similarity between the element in the feature vector and cluster center data of the first program file category is higher than a similarity between the element in the feature vector and cluster center data of any program file category other than the first program file category in the multiple program file categories.

It should be understood that, the cluster center data in this embodiment of the present disclosure may be obtained by clustering the feature vectors of the multiple program files using the clustering algorithm during clustering of the multiple program files, and be used to indicate the feature of the program file in the program file category to which the cluster center data belongs. The cluster center data includes multiple elements. The multiple elements may be all elements in the feature vector of the program file in the program file category to which the cluster center data belongs, or may be some elements in the feature vector of the program file in the program file category to which the cluster center data belongs, for example, may be some elements that appear frequently in elements in feature vectors of all program files in the program file category. When the multiple program files are clustered using different clustering algorithms, elements included in the cluster center data obtained after the clustering are also different. This is not limited in this embodiment of the present disclosure.

The clustering algorithm used in this embodiment of the present disclosure may be based on some existing algorithms, including but not limited to the following algorithms partitioning methods such as a k-means algorithm, a k-medoids algorithm, and a Clustering Large Applications based on RANdomized Search (CLARANS) algorithm, hierarchical methods such as a balanced iterative reducing and clustering using hierarchies (BIRCH) algorithm, a clustering using representatives (CURE) algorithm, and a chameleon algorithm, density-based algorithms such as a density-based spatial clustering of applications with noise (DBSCAN) algorithm, an ordering points to identify the clustering structure (OPTICS) algorithm, and a DENsity-based CLUstEring (DENCLUE) algorithm, graph theory clustering methods, mesh algorithms such as a STatistical INformation Grid-based method (STING) algorithm, a CLIQUE algorithm, and a wave cluster algorithm, model algorithms based on statistics or a neural network, and the like. Details are not described herein.

It should be further understood that, in this embodiment of the present disclosure, the program file is classified into a first program file, and the similarity between the element in the feature vector of the program file and the cluster center data of the first program file category is the highest. That the similarity is the highest means that similarities between the element in the feature vector of the program file and cluster center data of all program file categories are calculated, and that the similarity between the element in the feature vector of the program file and the cluster center data of the first program file category is the highest.

FIG. 8 is a schematic diagram of implementing a classification function according to an embodiment of the present disclosure. FIG. 9 is a schematic flowchart of implementing a classification function according to an embodiment of the present disclosure. The classification function may be implemented by a category designator. In step S901, the category designator obtains a feature vector of a program file. Then in step S902, using a classification algorithm, the category designator compares the feature vector with existing cluster center data, determines cluster center data that is most similar to the feature vector, and then classifies the program file corresponding to the feature vector into a corresponding program file category.

The program file classification system 400 may further include a web portal server 418. Using the web portal server 418, the system 400 may display classification information of a current program file in real time to related staff, such as an information technology (IT) administrator, of an enterprise. The related staff may select typical program files in each program file category, and perform deep analysis of the program files and minor program files that are unsuccessfully classified.

Figure 10:
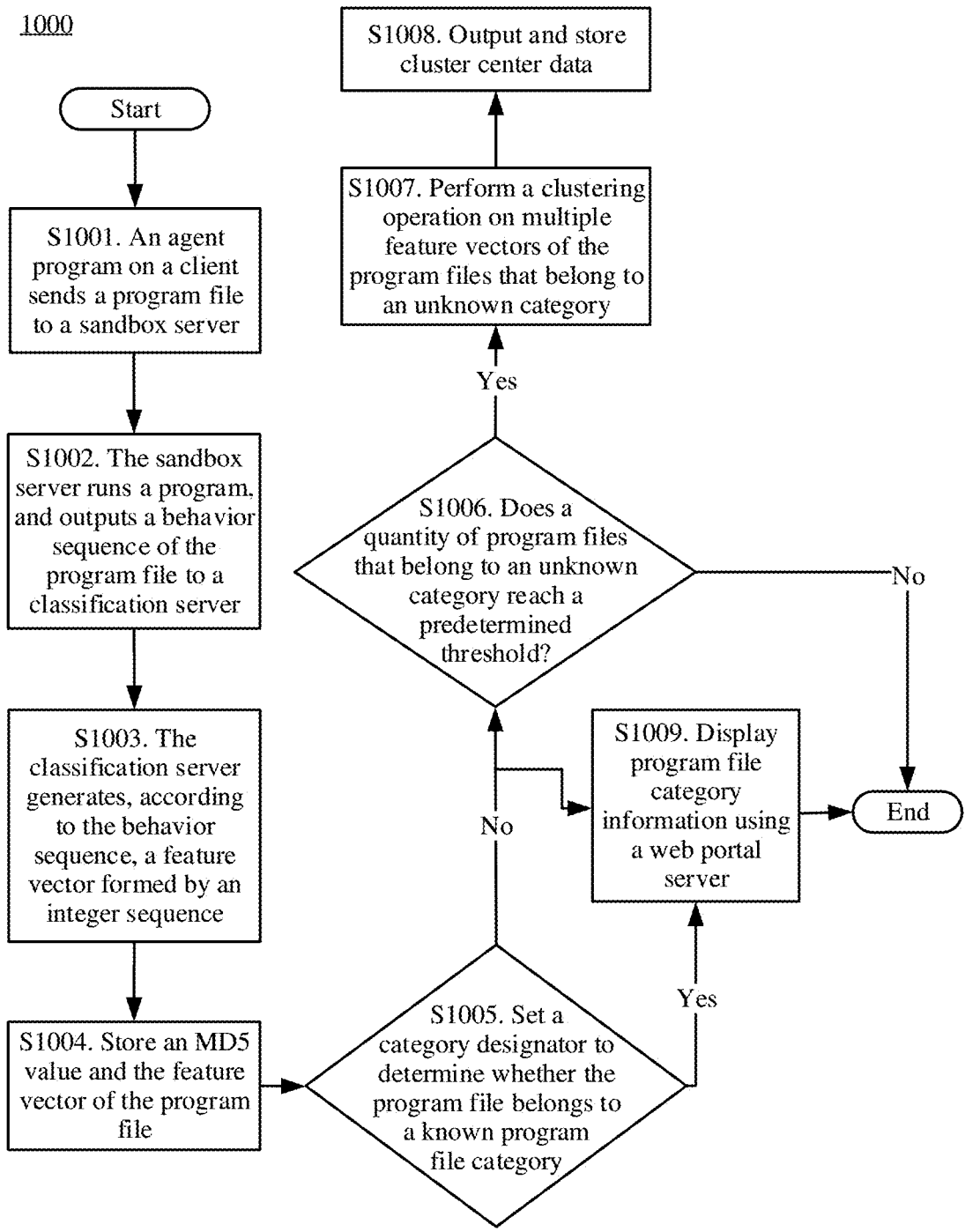
FIG. 10 is a schematic flowchart of a program file classification method according to another embodiment of the present disclosure.

The following describes a program file classification method 1000 according to an embodiment of the present disclosure with reference to FIG. 10. The method 1000 is executed by a program file classification system, and includes the following steps.

Step S1001: An agent program on a client sends a program file to a sandbox server. The program file may be a program file newly added to the client.

Step S1002: The sandbox server runs a program, and outputs a behavior sequence of the program file to a classification server. It should be understood that the behavior sequence may also be referred to as a behavior log. This is not limited in this embodiment of the present disclosure.

Step S1003: The classification server generates, according to the behavior sequence, a feature vector formed by an integer sequence.

Step S1004: Store an MD5 value and the feature vector of the program file to facilitate subsequent clustering or classification.

Step S1005: Set a category designator to determine, according to the feature vector, whether the program file belongs to a known program file category. When the program file belongs to a known program file category, step S1009 may be performed. When the program file does not belong to a known program file category, step S1006 is performed, and step S1009 may be concurrently performed.

Step S1006: Determine whether a quantity of program files that belong to an unknown category reaches a predetermined threshold. When the quantity does not reach the threshold, the procedure ends. When the quantity reaches the threshold, step S1007 is performed.

Step S1007: Perform a clustering operation on multiple feature vectors of the program files that belong to an unknown category.

Step S1008: Output and store cluster center data for use in subsequent classification.

Step S1009: Display program file category information using a web portal server. The program file category information may include a program file in each program file category, and may further include minor program files that are unsuccessfully classified or clustered, and the like.

In this embodiment of the present disclosure, each piece of behavior information in the behavior sequence of the program file is uniquely marked by an integer. For example, for a piece of behavior information, a behavior identifier is RegWriteValue, a behavior corresponding to the behavior identifier is executing a registry operation function RegWriteValue, and a path related to the behavior is HKEY_LOCAL_MACHINE\SYSTEM\ControlSet001\Control\BootDriverFlags. The behavior information is used as an independent feature, and an integer is allocated to the behavior information. In this way, a behavior sequence can be converted into an integer sequence that may also be referred to as a feature vector, such as [1, 2, 3, 4, 5].

A path related to the behavior in the behavior information is highly random. Consequently, there are a large quantity of independent features, and the independent features are excessively dispersed. To resolve this problem, a set of preset normalization rules may be used in this embodiment of the present disclosure to perform normalization process on the path in the behavior information. The path related to the behavior in the behavior information is simplified according to the preset normalization rules to reduce a quantity of independent features.

Further, a specific procedure for performing normalization process on the path may be as follows. The path includes a path of a file and a path of a registry.

1. Normalization or simplification process is performed on the path of the file. The path of the file includes a directory of the file, for example, M levels of directories, a file name, and a file name extension.

(a) Normalization of the M Levels of Directories.

At least one mapping relationship between a regular expression and an identifier may be prestored in the classification server. The at least one mapping relationship is referred to as a first-type mapping relationship. A mapping relationship between a first regular expression and a first identifier is one of the first-type mapping relationships. When the M levels of directories meet the first regular expression, the first N levels of directories in the M levels of directories are replaced with the first identifier, and remaining M-N levels of directories in the M levels of directories are replaced with a number M-N, where M is a positive integer, and N is a positive integer less than or equal to M. This case is applicable when the directory of the file sets a special directory as a root directory or a part of the directory.

Special directories include but are not limited to directories shown in Table 1.

TABLE 1

| Directory description | Regular expression of a directory | Identifier |
|---|---|---|
| IE temporary directory | [c-z]:\\Documents and Settings\\[^\\]+\\Local Settings\\Temporary Internet Files\\ | ietemp |
| APPDATA directory | [a-z]:\\\\DOCUMENTS AND SETTINGS\\\\[^\\\\]+\\\\APPLICATION DATA\\\\ | appdata |
| Start menu | [a-z]:\\\\DOCUMENTS AND SETTINGS\\\\[^\\\\]+\\\\start menu\\\\ | startmenu |
| User temporary directory | [a-z]:\\\\Documents and Settings\\\\[^\\\\]+\\\\Local Settings\\\\Temp\\\\ | localtmp |
| User APP DATA directory | [a-z]:\\\\Documents and Settings\\\\[^\\\\]+\\\\Local Settings\\\\Application Data\\\\ | Localappdata |
| Program common file directory | [a-z]:\\\\Program Files\\\\Common Files\\\\ | comm |

TABLE 1-continued

| Directory description | Regular expression of a directory | Identifier |
| --- | --- | --- |
| Program file path | [a-z]:\\\\Program Files\\\\ | pm |
| System directory | [a-z]:\\\\windows\\\\system32\\\\ | sysdir |
| Windows directory | [a-z]:\\\\windows\\\\ | windir |

Further, in an embodiment, a special directory may correspond to an abstracted identifier or name. During normalization process, if a directory of a path to be normalized matches a regular expression of the special directory in the table, the corresponding first several levels of directories are replaced with an identifier. In other words, if the directory of the path to be normalized matches the regular expression of the special directory in the table, the last level of directory that meets the regular expression and all previous levels of directories are replaced, as an entirety, with an identifier. In addition, a value of a quantity of levels of remaining directories is placed after the identifier.

For example, a directory C:\Documents and Setting\administrator\Temporary Internet Files\aaa\bbb may be converted into ietemp\:2 according to the mapping relationship given in Table 1.

When identifying a program file, people usually care about only key system directories accessed by the program file, and do not care about a specific subdirectory accessed by the program file. Therefore, the levels of directories in the path of the file are simplified.

When the M levels of directories in the path do not meet any mapping relationship in the first-type mapping relationships, that is, when the directories are non-special directories, the first L levels of directories in the M levels of directories are reserved, and remaining M-L levels of directories in the M levels of directories are replaced with a number M-L, where L is a positive integer less than or equal to M. Preferably, L is equal to 1. That is, only the first level of directory and a value of a quantity of levels of subsequent subdirectories are extracted from the M levels of directories. For example, a directory C\aaa\bbb\ccc\ddd is normalized into C:\AAA\:3.

It should be understood that, that the M levels of directories meet the first regular expression may be equivalent to that the M levels of directories include a special directory, such as a first directory.

It should be understood that, a name of the file includes a file name and a file name extension. The file name is separated from the file name extension by a separator ".".

(b) Normalization of the File Name.

When the file name meets a predetermined file name feature, the file name is replaced with a second identifier. A mapping relationship between the predetermined file name feature and the second identifier is one of second-type mapping relationships. The second-type mapping relationships include at least one mapping relationship between an identifier and a feature met by a file name.

In an embodiment, there may be two types of file names, a system file name and a non-system file name.

For example, at runtime of a program file, when a read or generated file name is consistent with a file name that inherently exists in an operating system, the file name is replaced with an identifier "sysname", or when a read or generated file name is inconsistent with a file name that inherently exists in an operating system, the file name is replaced with an identifier "normal".

Alternatively, some other features may be used as criteria. For example, if the file name includes a space, the file name is replaced with an identifier "space". If an accessed file is created by a program file itself at runtime of the program file, the file name is replaced with an identifier "SelfCreated". In another case, for example, if the file name includes no space, and the file name is not created by the program file itself, the file name is replaced with an identifier "any".

(c) Normalization of the File Name Extension.

The file name extension is replaced with a preset third identifier when the file name extension is not a file name extension in a preset file name extension list.

Further, in an embodiment, if the file name extension is in the preset file name extension list, no replacement is required. The file name extension is replaced with an identifier "UnStd" if the file name extension is not in the preset file name extension list.

For example, notepad is a system file name, and exe is a file name extension in the preset file name extension list. In this case, a path c:\windows\notepad.exe may be normalized into windir\sysname.exe. For another example, "aaa" is a non-system file name, and "rty" is not a file name extension in the preset file name extension list. In this case, a path c:\windows\aaa.rty may be normalized into windir\normal.UnStd.

2. Normalization is performed on the path of the registry. The path of the registry includes a subkey of the registry, for example, S levels of subkeys and a registry value name (i.e., ValueName).

(d) Normalization of the S Levels of Subkeys of the Registry.

When the S levels of subkeys meet a third regular expression, the first T levels of subkeys in the S levels of subkeys are reserved, and remaining S-T levels of subkeys in the S levels of subkeys are deleted. A mapping relationship between the third regular expression and T is one of third-type mapping relationships, the third-type mapping relationships include at least one mapping relationship between a regular expression and an integer, S is a positive integer, and T is a positive integer less than or equal to S. This case is applicable to a case in which the S levels of subkeys of the registry use a special subkey as a root subkey or a part of the subkeys.

Special subkeys include but are not limited to subkeys shown in Table 2.

TABLE 2

| Serial number | Subkey | Quantity of reserved levels of subkeys |
|---|---|---|
| 1 | AppEvents\EventLabels | 0 |
| 2 | AppEvents | 1 |
| 3 | Control Panel | 1 |
| 4 | HARDWARE\DESCRIPTION\System | 1 |
| 5 | HARDWARE\ACPI | 2 |
| 6 | HARDWARE\DEVICEMAP | 1 |
| 7 | HARDWARE\RESOURCEMAP | 1 |
| 8 | HARDWARE | 1 |
| 9 | SOFTWARE\Microsoft\Windows NT\CurrentVersion | 1 |
| 10 | SOFTWARE\Microsoft\Windows\CurrentVersion\Internet Settings | 1 |
| 11 | SOFTWARE\Microsoft\Windows\CurrentVersion\policies | 1 |
| 12 | SOFTWARE\Microsoft\Windows\CurrentVersion\Explorer | 1 |
| 13 | SOFTWARE\Microsoft\Windows\CurrentVersion\App Paths | 1 |
| 14 | SOFTWARE\Microsoft\Windows\CurrentVersion\policies | 1 |
| 15 | SOFTWARE\Microsoft\Windows\CurrentVersion | 1 |
| 16 | SOFTWARE\Microsoft\Internet Explorer | 1 |
| 17 | SOFTWARE\Policies\Microsoft\systemCertificates | 1 |
| 18 | SOFTWARE\Policies\Microsoft | 1 |
| 19 | SOFTWARE\Microsoft\ | 1 |
| 20 | SOFTWARE | 1 |
| 21 | SYSTEM\ControlSet001\Services\SharedAccess\Parameters\FirewallPolicy | 1 |
| 22 | SYSTEM\ControlSet001\Control\Session Manager | 1 |
| 23 | SYSTEM\ControlSet001\Control | 1 |
| 24 | SYSTEM\ControlSet001\Enum | 1 |
| 25 | SYSTEM\ControlSet001\Services | 1 |
| 26 | SYSTEM\ControlSet001 | 1 |
| 27 | SYSTEM\ControlSet002\Services\SharedAccess\Parameters\FirewallPolicy | 1 |
| 28 | SYSTEM\ControlSet002\Control\Session Manager | 1 |
| 29 | SYSTEM\ControlSet002\Control | 1 |
| 30 | SYSTEM\ControlSet002\Enum | 1 |
| 31 | SYSTEM\ControlSet002\Services | 1 |
| 32 | SYSTEM\ControlSet002 | 1 |
| 33 | SYSTEM\ControlSet003\Services\SharedAccess\Parameters\FirewallPolicy | 1 |
| 34 | SYSTEM\ControlSet003\Control\Session Manager | 1 |
| 35 | SYSTEM\ControlSet003\Control | 0 |
| 36 | SYSTEM\ControlSet003\Enum | 0 |
| 37 | SYSTEM\ControlSet003\Services | 0 |
| 38 | SYSTEM\ControlSet003 | 0 |
| 39 | SYSTEM\CurrentControlSet\Services\SharedAccess\Parameters\FirewallPolicy | 0 |
| 40 | SYSTEM\CurrentControlSet\Control\Session Manager | 1 |
| 41 | SYSTEM\CurrentControlSet\Control | 0 |
| 42 | SYSTEM\CurrentControlSet\Enum | 1 |
| 43 | SYSTEM\CurrentControlSet\Services | 1 |
| 44 | SYSTEM\currentcontrolset\services\winsock2 | 0 |
| 45 | SYSTEM\CurrentControlSet | 1 |
| 46 | SYSTEM | 2 |

In an embodiment, when the S levels of subkeys include the special subkey, a quantity of levels of subkeys subsequent to the subkey that need to be finally reserved is determined according to a value of the "quantity of reserved levels of subkeys". That is, when the S levels of subkeys meet a regular expression related to the subkey, the first T levels of subkeys in the S levels of subkeys are reserved, and the remaining S-T levels of subkeys in the S levels of subkeys are deleted.

It should be understood that, that the S levels of subkeys meet the third regular expression may be equivalent to that the S levels of subkeys include a special subkey.

For example, a subkey path of a registry is SOFTWARE\ADOBE\ACROBAT READER. This path meets the 20$^{th}$ item in Table 2. The item requires one level of subkey to be reserved. In this case, a normalized subkey of the registry is SOFTWARE\ADOBE.

A subkey absent from Table 2 is a non-special subkey, and a full path is reserved for all non-special subkeys.

In another case, for example, when a first subkey in the S levels of subkeys is a globally unique identifier CLSID, the first subkey is replaced with a fourth identifier.

Further, in an embodiment, a large quantity of CLSID-category subkeys usually exist in the path of the registry. A form of such a subkey may be {8591DA08-F8AD-333D-83FE-599CDACEB1A0}, and a regular expression used by the subkey may be indicated as \{[0-9a-f]{8}-[0-9a-f]{4}-[0-9a-f]{4}-[0-9a-f]{4}-[0-9a-f]{12}\}. When a level of subkey in the S levels of subkeys is such a subkey, a name of this level of subkey is replaced with an identifier "$clsid".

For example, when the S levels of subkeys of the path of the registry are CLSID\{8591DA08-F8AD-333D-83FE-599CDACEB1A0}\ProgId, a normalized path may be CLSID\$clsid\ProgId.

(e) Reserving of the Registry Value Name (i.e., Value-Name).

It should be understood that, a quantity of "\" in the regular expression in this embodiment of the present disclosure is merely an example, and expression of the regular expression is merely an example. Presentation forms of Table 1 and Table 2 are also merely examples, and content of Table 1 and Table 2 may be shown in other equivalent forms. This is not limited in this embodiment of the present disclosure.

It should be further understood that a path of a behavior may further include a window name, a process name, and the like. Corresponding normalization process may also be performed on the window name and the process name, to reduce path diversity. This is not limited in this embodiment of the present disclosure.

It should be further understood that the foregoing normalization is obtained by summarizing behaviors of malicious programs for a long time, or obtained based on experience. A quantity of features of program files can be reduced using the path normalization process implemented in the present disclosure.

In one case, a quantity of elements in a feature vector of a program file may be reduced according to the method in this embodiment of the present disclosure. For example, before normalization process, a feature vector of a program file X includes 100 elements. That is, an integer sequence corresponding to the program file X includes 100 integers. After normalization process, a quantity of elements in the feature vector of the program file X may be reduced to 70. That is, a quantity of integers included in the integer sequence corresponding to the program file X changes to 70. In this way, some similar behaviors of a program file are combined into one feature, a quantity of features is reduced, file features are more distinctive, and it is easier to cluster or classify the program file and other files.

In another case, a quantity of same features of two program files may be increased according to the method in this embodiment of the present disclosure. For example, before normalization process, a feature vector of a program file X includes 100 elements. That is, an integer sequence corresponding to the program file X includes 100 integers. A feature vector of a program file Y also includes 100 elements. That is, an integer sequence corresponding to the program file Y also includes 100 integers. In addition, it is assumed that the 100 elements in the feature vector of the program file X are totally different from the 100 elements in the feature vector of the program file Y. After normalization process, a quantity of elements in the feature vector of the program file X is still 100, a quantity of elements in the feature vector of the program file Y is still 100, but some elements in the 100 elements in the feature vector of the program file X are the same as some elements in the 100 elements in the feature vector of the program file Y. In this way, some similar behaviors of two program files are combined into one feature, a total quantity of features is reduced, and it is easier to cluster or classify the two program files into one program file category.

It should be understood that, the same elements in this embodiment of the present disclosure means that values of the elements are equal, regardless of locations of the elements in feature vectors or integer sequences.

According to the program file classification method in this embodiment of the present disclosure, the behavior information respectively corresponding to the at least two behaviors of the program file is obtained. The normalization process is performed on the path of the behavior in the behavior information to reduce the path diversity. The feature vector is generated according to the behavior information obtained after the path normalization process, and the category to which the program file belongs is determined according to the feature vector such that randomness of the path obtained after the normalization process is reduced, and accordingly, a program file classification effect is greatly improved.

Provided that an analyst randomly samples several program files from program files of each category for deep analysis, the analyst can understand whether the program files of this category are suspicious. In addition, minor program files that are unclassified, or not easy to classify, or in a category including few program files can be discovered in time such that analysis is focused on the minor program files, and a malicious program file is discovered in time. In this way, a workload in analyzing a mass of program files can be effectively reduced, and analysis efficiency can be improved.

Figure 11:
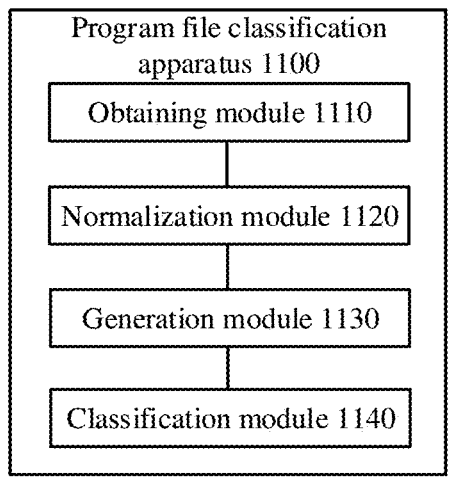
FIG. 11 is a schematic block diagram of a program file classification apparatus according to an embodiment of the present disclosure.

FIG. 11 is a schematic block diagram of a program file classification apparatus 1100 according to an embodiment of the present disclosure. The apparatus 1100 may include an obtaining module 1110 configured to obtain behavior information respectively corresponding to at least two behaviors executed by a program file at runtime, where each piece of behavior information includes a behavior identifier and a path related during execution of a corresponding behavior, a normalization module 1120 configured to perform normalization process on the path in each piece of behavior information obtained by the obtaining module 1110, where the normalization process is used to reduce path diversity, a generation module 1130 configured to generate a feature vector according to at least two pieces of behavior information obtained after the path normalization process performed by the normalization module 1120, where each element in the feature vector corresponds to one piece of behavior information obtained after the path normalization process, values of elements corresponding to same behavior information obtained after the path normalization process are the same, and the same behavior information is behavior information that has a same behavior identifier and a same path obtained after the normalization process, and a classification module 1140 configured to determine, according to the feature vector generated by the generation module 1130, a category to which the program file belongs.

According to the program file classification apparatus 1100 in this embodiment of the present disclosure, the behavior information respectively corresponding to the at least two behaviors of the program file is obtained. The normalization process is performed on the path of the behavior in the behavior information to reduce the path diversity. The feature vector is generated according to the behavior information obtained after the path normalization process, and the category to which the program file belongs is determined according to the feature vector such that randomness of a path obtained after the normalization process is reduced in order to improve a program file classification effect and accordingly reduce a workload of staff in identifying a malicious program file.

Optionally, in an embodiment, the path in the behavior information includes M levels of directories of a file, and the normalization module 1120 may be further configured to replace the first N levels of directories in the M levels of directories with a first identifier and replace remaining M-N levels of directories in the M levels of directories with a number M-N if the M levels of directories meet a first regular expression, where a mapping relationship between the first regular expression and the first identifier is one of first-type mapping relationships, the first-type mapping relationships include at least one mapping relationship between a regular expression and an identifier, M is a positive integer, and N is a positive integer less than or equal to M, or reserve the first L levels of directories in the M levels of directories and replace remaining M-L levels of directories in the M levels of directories with a number M-L if the M levels of directories do not meet any mapping relationship in the first-type mapping relationships, where L is a positive integer less than or equal to M.

Optionally, in an embodiment, the path in the behavior information includes a file name and a file name extension, and the normalization module is further configured to replace the file name with a second identifier if the file name meets a predetermined file name feature, where a mapping relationship between the predetermined file name feature and the second identifier is one of second-type mapping relationships, and the second-type mapping relationships include at least one mapping relationship between an identifier and a feature met by a file name, and replace the file name extension with a preset third identifier if the file name extension is not a file name extension in a preset file name extension list.

Optionally, in another embodiment, the path in the behavior information includes S levels of subkeys of a registry, and the normalization module 1120 may be further configured to reserve the first T levels of subkeys in the S levels of subkeys, and delete remaining S-T levels of subkeys in the S levels of subkeys if the S levels of subkeys meet a third regular expression, where a mapping relationship between the third regular expression and T is one of third-type mapping relationships, the third-type mapping relationships include at least one mapping relationship between a regular expression and an integer, S is a positive integer, and T is a positive integer less than or equal to S, and replace the first subkey with a fourth identifier if a first subkey in the S levels of subkeys is a globally unique identifier CLSID.

The normalization module 1120 in the three embodiments may deploy normalization process based on summarization of behaviors of malicious programs. A quantity of features of program files can be reduced using the path normalization process implemented in the present disclosure such that the program files can be more effectively classified.

Optionally, in an embodiment of the present disclosure, the classification module 1140 may be further configured to determine a similarity between the element in the feature vector and cluster center data of each of multiple program file categories using a classification algorithm, where the cluster center data is used to indicate a feature of a program file in a program file category to which the cluster center data belongs, and includes an element in a feature vector of the program file in the program file category to which the cluster center data belongs, and classify the program file into a first program file category, where a similarity between the element in the feature vector and cluster center data of the first program file category is higher than a similarity between the element in the feature vector and cluster center data of any program file category other than the first program file category in the multiple program file categories.

Optionally, in another embodiment of the present disclosure, the classification module 1140 may be further configured to cluster the feature vector and feature vectors of multiple other program files using a clustering algorithm to form at least one program file category, where a similarity between elements in feature vectors of program files in each program file category is higher than a threshold, and the program file is classified into a first program file category in the at least one program file category.

Optionally, in each embodiment of the present disclosure, the generation module 1130 may be further configured to indicate, as an integer, each piece of behavior information obtained after the path normalization process, where same behavior information obtained after the path normalization process is indicated as a same integer, and set each integer as one element in the feature vector, where multiple integers form the feature vector.

Optionally, in each embodiment of the present disclosure, the obtaining module 1110 may be further configured to obtain the program file using a monitor program, and obtain a behavior sequence of the program file using a sandbox server, where the behavior sequence includes the behavior information respectively corresponding to the at least two behaviors.

It should be understood that the apparatus 1100 may be the classification server described above.

Figure 12:
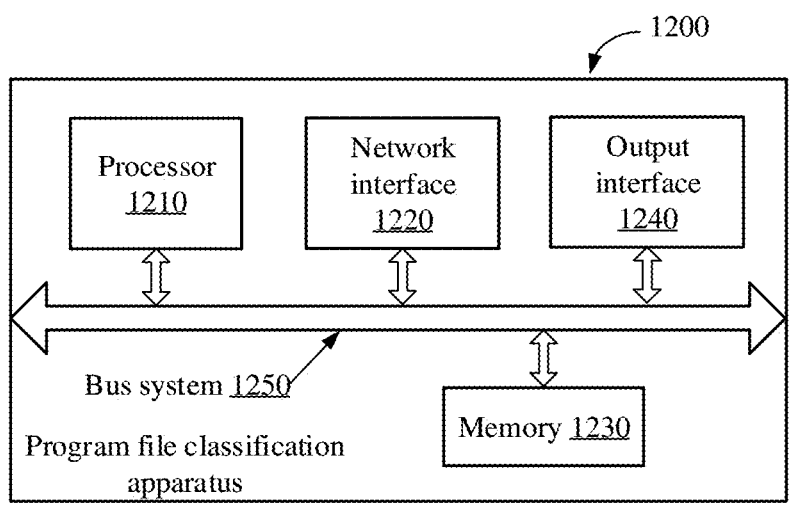
FIG. 12 is a schematic block diagram of a program file classification apparatus according to another embodiment of the present disclosure.

It should be noted that in this embodiment of the present disclosure, the obtaining module 1110 may be implemented using a network interface, and the normalization module 1120, the generation module 1130, and the classification module 1140 may be implemented using a processor. As shown in FIG. 12, a program file classification apparatus 1200 may include a processor 1210, a network interface 1220, and a memory 1230. The memory 1230 may be configured to store code or the like executed by the processor 1210. The apparatus 1200 may further include an output device (not shown) or an output interface 1240 connected to the output device in order to output a program file classification result. The output device includes a display, a printer, and the like.

Components in the apparatus 1200 are coupled together using a bus system 1250. In addition to a data bus, the bus system 1250 further includes a power bus, a control bus, and a status signal bus.

The apparatus 1100 shown in FIG. 11 or the apparatus 1200 shown in FIG. 12 can implement processes implemented in the embodiments in FIG. 1 to FIG. 10. To avoid repetition, details are not described herein again.

It should be noted that the method embodiment in the present disclosure may be applied to a processor or implemented by a processor. The processor may be an integrated circuit chip with a signal processing capability. In an implementation process, the steps in the method embodiment may be implemented using an integrated logical circuit of hardware in the processor, or using an instruction in a form of software. The processor may be a general-purpose processor, a digital signal processor (DSP), an application-specific integrated circuit (ASIC), a field programmable gate array (FPGA) or other programmable logical devices, a discrete gate or transistor logical device, or a discrete hardware assembly. The processor may implement or execute methods, steps, and logical block diagrams disclosed in the embodiments of the present disclosure. The general-purpose processor may be a microprocessor, or the processor may also be any conventional processor or the like. The steps of the methods disclosed with reference to the embodiments of the present disclosure may be directly implemented by a hardware decoding processor, or may be implemented by a combination of hardware and a software module in a decoding processor. The software module may be located in a mature storage medium in the art, such as a random access memory (RAM), a flash memory, a read-only memory (ROM), a programmable ROM (PROM), or an electrically erasable PROM (EEPROM), or a register. The storage medium is located in the memory. The processor reads information in the memory, and implements the steps of the methods in combination with the hardware of the processor.

It should be understood that, the memory in this embodiment of the present disclosure may be a volatile memory or a nonvolatile memory or may include both a volatile memory and a nonvolatile memory. The nonvolatile memory may be a ROM, a PROM, an erasable programmable ROM (EPROM), an EEPROM, or a flash memory. The volatile memory may be a RAM, which is used as an external cache. Illustratively but not restrictively, RAMs of many forms are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM. It should be noted that the memories in the system and method described in this specification are intended to include but are not limited to such memories and memories of any other proper types.

The network interface 1220 is configured to receive a behavior sequence of at least one program file sent by a sandbox server in an enterprise network. Further, the network interface 1220 may receive an MD5 value corresponding to the program file and the behavior sequence of the program file that are sent by the sandbox server. The network interface 1220 may be one network interface or multiple network interfaces. The network interface 1220 may receive a behavior sequence sent by one sandbox server, or receive behavior sequences sent by multiple sandbox servers. The network interface 1220 may be a wired interface, for example, a fiber distributed data interface (FDDI), a Gigabit Ethernet (GE) interface. Alternatively, the network interface 1220 may be a wireless interface.

An embodiment of the present disclosure further provides a program file classification system, which may be shown in FIG. 4. The program file classification system may include a client, a sandbox server, and a program file classification apparatus in an embodiment of the present disclosure. The program file classification apparatus corresponds to the classification server 416 in FIG. 4. The client includes a monitor program such that a program file in the client is obtained using the monitor program. The sandbox server is configured to receive the program file sent by the monitor program in order to generate a behavior sequence of the program file and provide the generated behavior sequence for the program file classification apparatus, where the behavior sequence includes at least two pieces of behavior information. The program file classification apparatus is configured to execute the program file classification method in the embodiments of the present disclosure.

The program file classification system in this embodiment of the present disclosure can implement processes of the program file classification method described in the embodiments of the present disclosure. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The computer software product is stored in a storage medium, and includes several instructions for instructing a computer device, which may be, for example, a personal computer, a server, or a network device, to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A program file classification method, comprising:
obtaining, by a classification server, behavior information respectively corresponding to at least two behaviors executed by a program file at runtime, wherein each piece of behavior information comprises a behavior identifier and a path related during execution of a corresponding behavior, wherein the path in each piece of behavior information comprises M levels of directories of a file, and wherein M is a positive integer;
performing, by the classification server, normalization processing on the path in each piece of behavior information, wherein the normalization processing reduces path diversity, and wherein performing the normalization processing on the path in each piece of behavior information comprises replacing, by the classification server, first N levels of directories in the M levels of directories with a first identifier and replacing, by the classification server, remaining M-N levels of directories in the M levels of directories with a number M-N when the M levels of directories meet a first regular expression, wherein N is a positive integer less than or equal to M, wherein a mapping relationship between the first regular expression and the first identifier belongs to one of first-type mapping relationships, and wherein the first-type mapping relationships comprise at least one mapping relationship between a set of regular expressions and an identifier;
generating, by the classification server, a feature vector according to at least two pieces of behavior information obtained after the path normalization processing, wherein each element in the feature vector corresponds to one piece of behavior information obtained after the path normalization processing, wherein values of elements corresponding to same behavior information obtained after the path normalization processing are the same, and wherein the same behavior information comprises a same behavior identifier and a same path obtained after the normalization processing; and
determining, by the classification server, according to the feature vector, a category to which the program file belongs.

2. The program file classification method of claim 1, wherein the path in each piece of behavior information further comprises a file name and a file name extension, and wherein performing the normalization processing on the path in each piece of behavior information comprises:
replacing, by the classification server, the file name with a second identifier when the file name meets one of a set of predetermined file name features, wherein a mapping relationship between the set of predetermined file name features and the second identifier belongs to one of second-type mapping relationships, and wherein the second-type mapping relationships comprise at least one mapping relationship between an identifier and a set of predetermined file name features met by a file name; and
replacing, by the classification server, the file name extension with a preset third identifier when the file name extension is not a file name extension in a preset file name extension list.

3. The program file classification method of claim 1, wherein the path in each piece of behavior information further comprises S levels of subkeys of a registry, and wherein performing the normalization process on the path in each piece of behavior information comprises:
reserving, by the classification server, first T levels of subkeys in the S levels of subkeys, and deleting, by the classification server, remaining S-T levels of subkeys in the S levels of subkeys when the S levels of subkeys meet a third regular expression, wherein a mapping relationship between the third regular expression and T comprises one of third-type mapping relationships, wherein the third-type mapping relationships comprise at least one mapping relationship between a regular expression and an integer, wherein S is a positive integer, and wherein T is a positive integer less than or equal to S; and
replacing, by the classification server, a first subkey with a fourth identifier when the first subkey in the S levels of subkeys comprises a globally unique identifier CLSID.

4. The program file classification method of claim 1, wherein determining the category to which the program file belongs comprises:
determining, by the classification server, a similarity between an element in the feature vector and cluster center data of each of a plurality of program file categories using a classification algorithm, wherein the cluster center data indicates a feature of a program file in a program file category to which the cluster center data belongs, and comprises an element in a feature vector of the program file in the program file category to which the cluster center data belongs; and
classifying, by the classification server, the program file into a first program file category, wherein a similarity between the element in the feature vector and cluster center data of the first program file category is higher than a similarity between the element in the feature vector and cluster center data of any program file category other than the first program file category in the plurality of program file categories.

5. The program file classification method of claim 3, wherein determining the category to which the program file belongs comprises:
determining, by the classification server, a similarity between an element in the feature vector and cluster center data of each of a plurality of program file categories using a classification algorithm, wherein the cluster center data indicates a feature of a program file in a program file category to which the cluster center data belongs, and comprises an element in a feature vector of the program file in the program file category to which the cluster center data belongs; and
classifying, by the classification server, the program file into a first program file category, wherein a similarity between the element in the feature vector and cluster center data of the first program file category is higher than a similarity between the element in the feature vector and cluster center data of any program file category other than the first program file category in the plurality of program file categories.

6. The program file classification method of claim 1, wherein determining the category to which the program file belongs comprises clustering, by the classification server, the feature vector and feature vectors of a plurality of other program files using a clustering algorithm to form at least one program file category, wherein a similarity between elements in feature vectors of program files in each program file category is higher than a threshold, and wherein the program file is classified into a first program file category in the at least one program file category.

7. The program file classification method of claim 1, wherein generating the feature vector comprises:
  indicating, by the classification server, as an integer, each piece of behavior information obtained after the path normalization processing, wherein same behavior information obtained after the path normalization processing is indicated as a same integer; and
  setting, by the classification server, each integer as one element in the feature vector, wherein a plurality of integers form the feature vector.

8. The program file classification method of claim 1, wherein performing the normalization processing on the path in each piece of behavior information comprises reserving, by the classification server, first L levels of directories in the M levels of directories and replacing remaining M-L levels of directories in the M levels of directories with a number M-L when the M levels of directories do not meet any mapping relationship in the first-type mapping relationships, wherein L is a positive integer less than or equal to M.

9. A program file classification apparatus, comprising:
  a network interface configured to obtain behavior information respectively corresponding to at least two behaviors executed by a program file at runtime, wherein each piece of behavior information comprises a behavior identifier and a path related during execution of a corresponding behavior, wherein the path in each piece of behavior information comprises M levels of directories of a file, and wherein M is a positive integer;
  a memory coupled to the network interface and configured to store instructions;
  at least one processor coupled to the network interface and the memory, wherein the instructions cause the at least one processor to be configured to:
    perform normalization processing on the path in each piece of behavior information, wherein the normalization processing reduces path diversity, and wherein performing the normalization processing on the path in each piece of behavior information comprises:
      replacing first N levels of directories in the M levels of directories with a first identifier and replacing remaining M-N levels of directories in the M levels of directories with a number M-N when the M levels of directories meet a first regular expression, wherein N is a positive integer less than or equal to M, wherein a mapping relationship between the first regular expression and the first identifier belongs to one of first-type mapping relationships, and wherein the first-type mapping relationships comprise at least one mapping relationship between a set of regular expressions and an identifier; and
      reserving first L levels of directories in the M levels of directories and replacing remaining M-L levels of directories in the M levels of directories with a number M-L when the M levels of directories do not meet any mapping relationship in the first-type mapping relationships, wherein L is a positive integer less than or equal to M;
    generate a feature vector according to at least two pieces of behavior information obtained after the path normalization processing, wherein each element in the feature vector corresponds to one piece of behavior information obtained after the path normalization processing, wherein values of elements corresponding to same behavior information obtained after the path normalization processing are the same, and wherein the same behavior information comprises a same behavior identifier and a same path obtained after the normalization processing; and
    determine, according to the feature vector generated, a category to which the program file belongs.

10. The program file classification apparatus of claim 9, wherein the path in each piece of behavior information further comprises a file name and a file name extension, and wherein the instructions further cause the at least one processor to be configured to:
  replace the file name with a second identifier when the file name meets one of a set of predetermined file name features, wherein a mapping relationship between the set of predetermined file name features and the second identifier belongs to one of second-type mapping relationships, and wherein the second-type mapping relationships comprise at least one mapping relationship between an identifier and a set of predetermined file name features met by a file name; and
  replace the file name extension with a preset third identifier when the file name extension is not a file name extension in a preset file name extension list.

11. The program file classification apparatus of claim 9, wherein the path in each piece of behavior information further comprises S levels of subkeys of a registry, and wherein the instructions further cause the at least one processor to be configured to:
  reserve first T levels of subkeys in the S levels of subkeys, and delete remaining S-T levels of subkeys in the S levels of subkeys when the S levels of subkeys meet a third regular expression, wherein a mapping relationship between the third regular expression and T comprises one of third-type mapping relationships, wherein the third-type mapping relationships comprise at least one mapping relationship between a regular expression and an integer, wherein S is a positive integer, and wherein T is a positive integer less than or equal to S; and
  replace a first subkey with a fourth identifier when the first subkey in the S levels of subkeys comprises a globally unique identifier CLSID.

12. The program file classification apparatus of claim 9, wherein the instructions further cause the at least one processor to be configured to:
  determine a similarity between an element in the feature vector and cluster center data of each of a plurality of program file categories using a classification algorithm, wherein the cluster center data indicates a feature of a program file in a program file category to which the cluster center data belongs, and comprises an element in a feature vector of the program file in the program file category to which the cluster center data belongs; and
  classify the program file into a first program file category, wherein a similarity between the element in the feature vector and cluster center data of the first program file category is higher than a similarity between the element in the feature vector and cluster center data of any program file category other than the first program file category in the plurality of program file categories.

13. The program file classification apparatus of claim 11, wherein the instructions further cause the at least one processor to be configured to:
  determine a similarity between an element in the feature vector and cluster center data of each of a plurality of program file categories using a classification algorithm, wherein the cluster center data indicates a feature of a program file in a program file category to which the cluster center data belongs, and comprises an element in a feature vector of the program file in the program file category to which the cluster center data belongs; and classify the program file into a first program file category, wherein a similarity between the element in the feature vector and cluster center data of the first program file category is higher than a similarity between the element in the feature vector and cluster center data of any program file category other than the first program file category in the plurality of program file categories.

14. The program file classification apparatus of claim 9, wherein the instructions further cause the at least one processor to be configured to cluster the feature vector and feature vectors of a plurality of other program files using a clustering algorithm to form at least one program file category, wherein a similarity between elements in feature vectors of program files in each program file category is higher than a threshold, and wherein the program file is classified into a first program file category in the at least one program file category.

15. The program file classification apparatus of claim 9, wherein the instructions further cause the at least one processor to be configured to:
   indicate, as an integer, each piece of behavior information obtained after the path normalization processing, wherein same behavior information obtained after the path normalization processing is indicated as a same integer; and
   set each integer as one element in the feature vector, wherein a plurality of integers form the feature vector.

16. A program file classification method, comprising:
obtaining, by a classification server, behavior information respectively corresponding to at least two behaviors executed by a program file at runtime, wherein each piece of behavior information comprises a behavior identifier and a path related during execution of a corresponding behavior, wherein the path in each piece of behavior information comprises M levels of directories of a file, and wherein M is a positive integer;

performing, by the classification server, normalization processing on the path in each piece of behavior information, wherein the normalization processing reduces path diversity, and wherein performing the normalization processing on the path in each piece of behavior information comprises reserving, by the classification server, first L levels of directories in the M levels of directories and replacing remaining M-L levels of directories in the M levels of directories with a number M-L when the M levels of directories do not meet any mapping relationship in first-type mapping relationships, wherein the first-type mapping relationships comprise at least one mapping relationship between a set of regular expressions and an identifier wherein L is a positive integer less than or equal to M;

generating, by the classification server, a feature vector according to at least two pieces of behavior information obtained after the path normalization processing, wherein each element in the feature vector corresponds to one piece of behavior information obtained after the path normalization processing, wherein values of elements corresponding to same behavior information obtained after the path normalization processing are the same, and wherein the same behavior information comprises a same behavior identifier and a same path obtained after the normalization processing; and determining, by the classification server, according to the feature vector, a category to which the program file belongs.

* * * * *